(12) United States Patent
Emmons et al.

(10) Patent No.: US 6,543,678 B1
(45) Date of Patent: Apr. 8, 2003

(54) METHOD OF BRAZING BERYLLIUM-ALUMINUM ALLOY MEMBERS TO FORM A BERYLLIUM-ALUMINUM ALLOY ASSEMBLY AND COATING THE BERYLLIUM-ALUMINUM ALLOY ASSEMBLY

(75) Inventors: John L. Emmons, Los Altos, CA (US); Robert Hardesty, San Ramon, CA (US)

(73) Assignee: The Peregrine Falcon Corporation, Pleasanton, CA (US)

( * ) Notice: Subject to any disclaimer, the term of this patent is extended or adjusted under 35 U.S.C. 154(b) by 727 days.

(21) Appl. No.: 08/939,762

(22) Filed: Sep. 29, 1997

(51) Int. Cl.⁷ .................................................. B23K 1/19
(52) U.S. Cl. ............................ 228/262.51; 228/262.5; 228/262.1; 228/214; 228/262.9
(58) Field of Search ..................... 228/262.51, 262.5, 228/262.1, 214, 262.9; 148/23, 437, 442

(56) References Cited

U.S. PATENT DOCUMENTS

| | | | |
|---|---|---|---|
| 3,951,328 A | * 4/1976 | Wallace et al. ............. | 228/207 |
| 3,971,657 A | * 7/1976 | Daver ......................... | 75/211 |
| 5,263,640 A | 11/1993 | Mahoney et al. ........... | 228/190 |
| 5,470,014 A | 11/1995 | Pritchard et al. ........... | 228/208 |
| 5,473,418 A | * 12/1995 | Kazakos et al. ............ | 355/259 |
| 5,697,045 A | * 12/1997 | Osame et al. ................ | 419/48 |

OTHER PUBLICATIONS

Publication entitled Joining II: Brazing and Soldering by L.A. Grant, published by Plenum Publishing Corporation, 1979.

* cited by examiner

Primary Examiner—M. Alexandra Elve
(74) Attorney, Agent, or Firm—Thomas Schneck; David M. Schneck

(57) ABSTRACT

A method for brazing beryllium-aluminum alloy members to form a beryllium-aluminum alloy assembly and coating the beryllium-aluminum alloy assembly in which an aluminum-silicon based braze alloy is placed between the beryllium-aluminum members at the locations for forming braze joints. The aluminum-silicon based braze alloy is surrounded by a brazing flux comprising aluminum fluoride. The beryllium-aluminum alloy members and the aluminum-silicon based braze alloy are heated to form the beryllium-aluminum alloy assembly. Oxidized surfaces appearing on the beryllium-aluminum alloy members are removed. Thereupon, the beryllium-aluminum alloy assembly is coated by plasma deposition of alumina-titania powder.

14 Claims, 2 Drawing Sheets

TABLE 1

| SAMPLES | RESULT IN PSI |
|---|---|
| 1 | 10,730 |
| 2 | 12,540 |
| 3 | 10,680 |
| 4 | 12,460 |
| 5 | 14,550 |
| AVERAGE | 12,192 |

BRAZE SHEAR SAMPLE RESULTS

FIG. 2

TABLE 2

| SAMPLES | RESULTS IN MEGOHMS |
|---|---|
| 1 | 40 |
| 2 | 45 |
| 3 | 61 |
| 4 | 56 |
| 5 | 54 |
| AVERAGE | 51 |

ELECTRICAL INSULATION TESTS ON ALUMINA-TITANIA COATING AT 50 VOLTS D.C.

FIG. 3

METHOD OF BRAZING BERYLLIUM-ALUMINUM ALLOY MEMBERS TO FORM A BERYLLIUM-ALUMINUM ALLOY ASSEMBLY AND COATING THE BERYLLIUM-ALUMINUM ALLOY ASSEMBLY

BACKGROUND OF THE INVENTION

The present invention relates, in general, to the method of brazing and coating of metallic alloy members and, more particularly, to a method of brazing beryllium-aluminum alloy members to form a beryllium-aluminum alloy assembly and coating the beryllium-alloy assembly.

Beryllium-aluminum alloy members have tenacious oxide surfaces making it difficult to join or coat.

Heretofore, beryllium-aluminum alloy members were joined mechanically, by adhesive bonding, by dip brazing, and by vacuum furnace brazing. The mechanical bonding of beryllium-aluminum assemblies by nuts and bolts added significant weight and space to the assemblies. The adhesive bonding of beryllium-aluminum alloy members did not provide adequate strength and was not a totally satisfactory medium for transferring thermal energy. Dip brazing of beryllium-aluminum alloy members required the beryllium-aluminum alloy members to be precisely machined to form small joint gaps in order to keep the brazing alloy in the joints during the heating process. It was found that dip brazing to form a moderate to complex assembly provided inadequate braze fillets, if any. Braze fillets are desirable in beryllium-aluminum alloy assemblies, since joint stresses are carried by fillets rather than by faying surfaces. In the vacuum furnace brazing of a beryllium-aluminum alloy members, the faying surfaces of the beryllium-aluminum alloy members required thorough cleaning by grinding and by the use of chemicals. Such pre-cleaning processes were followed by applying a direct pressure on the joint during brazing.

Oxide surfaces naturally form on beryllium-aluminum alloy members. With oxide surfaces on the beryllium-aluminum alloy assembly, an anodic coating could not be readily formed on the beryllium-aluminum alloy assembly of sufficient thickness or of sufficient hardness to provide a wear resistant coating or an electrical insulating coating of the quality formed on aluminum. Beryllium-aluminum alloy assemblies were coated with primers, paints and by plating.

SUMMARY OF THE INVENTION

An object of the present invention is to provide an improved method for brazing beryllium-aluminum alloy members to form a beryllium-aluminum alloy assembly.

Another object of the present invention is to provide a method for coating beryllium-aluminum alloy members to achieve greater hardness for the coating and to achieve improved abrasive resistant and electrical insulating characteristics for the coating.

Another object of the present invention is to provide a method for coating a beryllium-aluminum alloy assembly by removing oxidized surfaces from the beryllium-aluminum alloy assembly and thereafter coating the surfaces of the beryllium-aluminum alloy members free of oxides to achieve improved wear resistance and to achieve improved abrasive resistant and electrical insulating characteristics for the coating.

Another object of the present invention is to provide a method for brazing beryllium-aluminum alloy members to form a beryllium-aluminum alloy assembly without significantly increasing weight and without significantly increasing the space occupied by the beryllium-aluminum alloy assembly.

Another object of the present invention is to provide a method for brazing beryllium-aluminum alloy members for improving the transfer of thermal heat energy in a beryllium-aluminum alloy assembly.

Another object of the present invention is to provide a method for brazing beryllium-aluminum alloy assemblies without the need for applying direct pressure to the joint during the brazing process.

Another object of the present invention is to provide a method for brazing beryllium-aluminum alloy members to facilitate the maintaining of a braze alloy in the joints of a beryllium-aluminum alloy assembly during the heating process.

Another object of the present invention is to provide a method for brazing beryllium-aluminum alloy members by forming braze fillets in the joints of a beryllium-aluminum alloy assembly which fill the gaps in the joints of the beryllium-aluminum alloy assembly and which are suitable for carrying stress loads in the joints of the beryllium-aluminum alloy assembly.

Briefly described, the method of the present invention for brazing beryllium-aluminum alloy members to form a beryllium-aluminum alloy assembly comprises the following steps:

(a) cleaning the surface of beryllium-aluminum alloy members;

(b) placing beryllium-aluminum alloy members to form a beryllium-aluminum alloy assembly;

(c) disposing a braze alloy at locations to form braze joints;

(d) applying a brazing flux to the braze alloy at the braze joint locations, the brazing flux comprising the following;

potassium chloride
aluminum fluoride
sodium chloride
sodium fluoride
lithium fluoride; and (e) heating the beryllium-aluminum alloy members and the braze alloy to form the beryllium-aluminum alloy assembly.

Briefly described, the method of the present invention for coating a beryllium-aluminum alloy assembly after brazing the beryllium-aluminum alloy members comprises the steps of:

(a) cleaning the surfaces of the beryllium-aluminum alloy members; and (b) coating the surfaces of the beryllium-aluminum alloy members by plasma deposition of alumina-titania.

BRIEF DESCRIPTION OF THE DRAWINGS

FIG. 2 is a table illustrating the shear strength of joined beryllium-aluminum alloy members that have been brazed in accordance with the present invention to form a beryllium-aluminum alloy assembly.

FIG. 3 is a table illustrating the resistance of an alumina-titania coating applied to beryllium-aluminum alloy assembly in accordance with the present invention.

DETAILED DESCRIPTION OF THE PREFERRED EMBODIMENT

Figure 1:
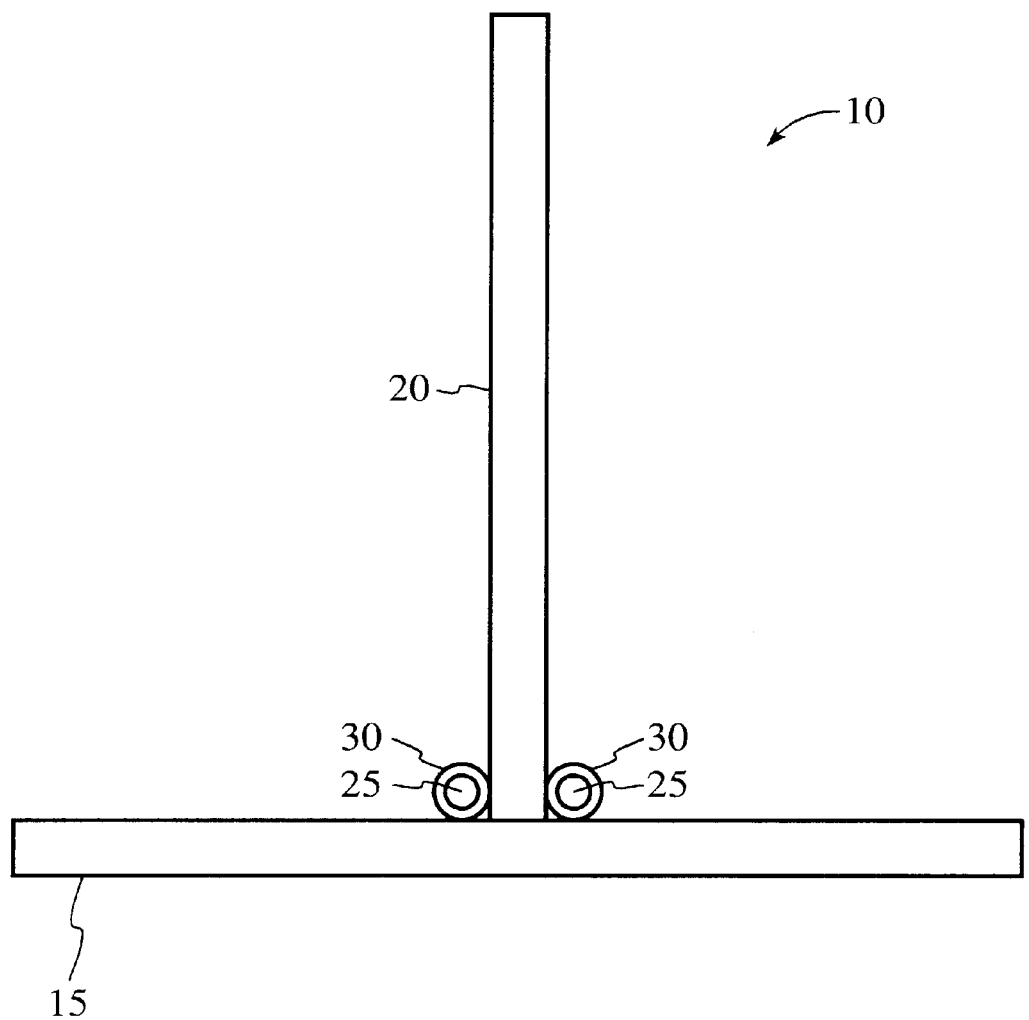
FIG. 1 is a diagrammatic illustration of a beryllium-aluminum alloy assembly in which the beryllium-aluminum alloy members thereof have been brazed in accordance with the present invention.

In the exemplary embodiment, beryllium-aluminum alloy members, such as beryllium-aluminum alloy members 15 and 20 (FIG. 1), include, respectively, at least 45% by volume of beryllium and the remainder thereof is substantially all aluminum. The mixed beryllium and the aluminum particles are bound together by hot isostatic pressing for forming a unitary structure. Other means for uniting the beryllium particles and the aluminum particles may be employed to form a beryllium-aluminum alloy member, such as extrusion and rolling. The beryllium-aluminum alloy members 15 and 20 are joined together to form a beryllium-aluminum alloy assembly 10.

Initially, the beryllium-aluminum alloy members 15 and 20 are cleaned by the application of suitable cleaning solutions, such as the application of acetone followed by the application of isopropyl alcohol to remove oil or other foreign substances. A cloth, or the like, is employed, in the exemplary embodiment, to apply the acetone and the isopropyl alcohol. After the beryllium-aluminum alloy members 15 and 20 are cleaned by the application of acetone and isopropyl alcohol, they are dried by a suitable drying agent, such as blown nitrogen gas.

Oxides generally form on the surfaces of the beryllium-aluminum alloy members. After the application of the nitrogen gas, the oxidized surfaces that had formed on the beryllium-aluminum alloy members 15 and 20 are removed. The oxidized surfaces on the beryllium alloy members are removed in a suitable manner, such as by an acid etch. A suitable acid etch includes a mixture of hydrofluoric acid and nitric acid.

After the oxide surfaces are removed from the beryllium-aluminum members 15 and 20, the beryllium-aluminum alloy members 15 and 20 are, in the exemplary embodiment, abraded manually with an abrasive pad. After the beryllium-aluminum alloy members 15 and 20 are abraded, the beryllium-aluminum alloy members 15 and 20 are rinsed in a rinse tank, in which there is agitated or flowing distilled water. In the exemplary embodiment, the beryllium-aluminum alloy members 15 and 20 are disposed in the agitated or flowing distilled water for approximately two minutes.

The beryllium-aluminum alloy members 15 and 20 are removed from the rinse tank and dipped in a suitable acid solution. In the exemplary embodiment, the acid solution by volume includes 5% hydrogen fluoride, 30% nitric acid, and 65% distilled water. In the exemplary embodiment, the beryllium-aluminum alloy members 15 and 20 are dipped in the acid solution for approximately thirty seconds. Thereafter, the beryllium-aluminum alloy members 15 and 20 are rinsed in agitated distilled water for approximately five minutes.

At this time, the beryllium-aluminum alloy members 15 and 20 are removed from the rinse tank and dried in a suitable manner. In the exemplary embodiment, the drying of the beryllium-aluminum alloy members is by blown nitrogen gas. Thereafter, the beryllium-aluminum alloy members 15 and 20 are oven dried. In the exemplary embodiment, the beryllium-aluminum alloy members 15 and 20 are oven dried for approximately fifteen minutes within a range of 100° centigrade. and 150° centigrade. In the preferred embodiment, the beryllium-aluminum alloy members 15 and 20 are brazed within four hours after the beryllium-aluminum alloy members 15 and 20 are removed from the oven to form a beryllium-aluminum alloy assembly.

The beryllium-aluminum alloy members 15 and 20 are now placed in position by suitable fixtures to form the beryllium-aluminum alloy assembly 10. A braze alloy 25 is placed at the joints for the joining of the beryllium-aluminum alloy members 15 and 20. The braze alloy 25 fills the gaps at the joints for the joining of the beryllium-aluminum alloy members 15 and 20 and form fillets therealong. In the preferred embodiment, the braze alloy 25 is an aluminum-silicon based braze paste alloy, such as LTB-37SSK or LTB-43-00SSK NICKOLOK manufactured by Ommi Technologies of Epping, N.H. The braze alloy may also be a braze alloy wire, such as braze alloy wire Nos. 4043 or 4047 manufactured by Harris Welco of Cincinnati, Ohio.

Should a braze alloy wire be used, then the braze alloy wire is cleaned by the application of suitable cleaning solutions, such as by the application of acetone, followed by the application of isopropyl alcohol to remove oils and other foreign substances. A cloth, or the like is employed to apply the acetone and the isopropyl alcohol. After the braze alloy wire is cleaned by the acetone and the isopropyl alcohol, it is dried by a suitable drying agent, such a by blown nitrogen gas. After the application of nitrogen gas, any oxide surface that has formed on the braze alloy wire is removed. Oxide surfaces on the braze alloy wire are removed in a suitable manner, such as the use of an acid etch. A suitable acid etch includes a mixture of hyrofluoric acid and nitric acid.

Before placing the braze alloy 25 at the joints for the joining of the beryllium-aluminum alloy members 15 and 20, a brazing flux 30 is disposed in the gaps at the joints of the beryllium-aluminum alloy members 15 and 20. The brazing flux 30, in the exemplary embodiment, comprises potassium chloride, aluminum fluoride, sodium chloride, sodium fluoride, and lithium fluoride, which are mixed with a suitable amount of isopropyl alcohol to form a flux paste. The fluorides in the brazing flux 30 serve as a deoxidizing agent. The chlorides in the brazing flux 30 depress the melting temperature of the brazing flux within a compatible range for the braze alloy. In the exemplary embodiment, the brazing flux 30 comprises the following by weight:

Potassium chloride in the range of 0% and 65%;
Aluminum fluoride in the range of 2% and 54%;
Sodium chloride in the range of 0% and 49%;
Sodium fluoride in the range of 0% and 54%; and
Lithium fluoride in the range of 2% and 69%.

In the preferred embodiment, the brazing flux 30 comprises the following by weight:

39.6% potassium chloride;
5.5% aluminum fluoride;
19.0% sodium chloride;
16.1% sodium fluoride; and
19.8% lithium fluoride.

The brazing flux 30 is disposed at the braze joint between joining beryllium-aluminum alloy members 15 and 20 and the braze alloy 25 is disposed on top of the brazing flux 30 to form a joint between joining beryllium-aluminum alloy members 15 and 20. A layer of brazing flux 30 is also disposed on top of the braze alloy 25. The brazing flux 30 surrounds the braze alloy in forming of a joint between joining beryllium-aluminum alloy members 15 and 20. The amount of brazing flux 30 is sufficient to fill the braze joint between joining beryllium-aluminum alloy members 15 and 20.

Depending upon the mass of the beryllium-aluminum alloy members 15 and 20 and depending upon the tooling and fixtures, the time period for brazing joining beryllium-aluminum alloy members 15 and 20 and the temperature for brazing joining beryllium-aluminum alloy members 15 and 20 may vary. Generally, the beryllium-aluminum alloy members 15 and 20 and the braze alloy solder 25 are heated rapidly. For example, the beryllium-aluminum alloy members 15 and 20 and the braze alloy solder 25 are heated between 1,100° Fahrenheit. and 1,195° Fahrenheit. in less than twenty minutes and held between this range of temperature for approximately three minutes.

In the preferred embodiment, the beryllium-aluminum alloy assembly 10 is cooled rapidly after the aforementioned three minute heating period. In the exemplary embodiment, the rapid cool temperature is 1,000° Fahrenheit., which is accomplished in approximately two minutes. The rapid cooling of the beryllium-aluminum alloy assembly 10 is followed by a slow controlled cooling of the beryllium-aluminum alloy assembly 10. In the slow controlled cooling of the beryllium-aluminum alloy assembly 10, the beryllium-aluminum alloy assembly 10 is cooled to ambient temperature in approximately two hours so as not to produce any distortion in the beryllium-aluminum alloy assembly 10.

After the beryllium-aluminum alloy assembly 10 has been cooled to ambient temperature, it is cleaned by the application of suitable cleaning solutions. In the exemplary embodiment, the cleaning solutions are warm water followed by acetone, which is then followed by isopropyl alcohol. In the exemplary embodiment, the acetone and the isopropyl alcohol are applied by a suitable cloth. Following the cleaning of the beryllium-aluminum alloy assembly 10 with acetone and isopropyl alcohol, the beryllium-aluminum alloy assembly 10, in the exemplary embodiment, is abraded by hand using suitable pads or is subjected to a vapor blast, such as blasting sand mixed with distilled water. When using the vapor blast to abrade the beryllium-aluminum alloy assembly 10, the vapor blast, in the preferred embodiment, has a force of 40–80 pounds per square inch with a sixty mesh aluminum-oxide grit to obtain a 120 root mean square finish.

After obtaining the desired finish on the beryllium-aluminum alloy assembly 10, the beryllium-aluminum alloy assembly 10 is cleaned with suitable solutions, such as the application of acetone followed by the application of isopropyl alcohol. In the exemplary embodiment, the acetone and the isopropyl alcohol are applied by a suitable cloth.

In the coating of the beryllium-aluminum assembly 10, alumina-titania powder is dried before use, in the exemplary embodiment, at 200° Fahrenheit. for approximately thirty minutes and mixed for ten minutes. The beryllium-aluminum alloy assembly 10 is fixtured by suitable tooling. Such tooling may be aluminum tooling. In the preferred embodiment, the mixed alumina-titania powder is sprayed onto the beryllium-aluminum assembly 10 by a plasma deposition method until the coat is between 0.002 to 0.004 inches in thickness. Before spraying the alumina-titania powder onto the beryllium-aluminum alloy assembly 10, the beryllium-aluminum alloy members 15 and 20 are cleaned. Toward this end, any oxidized surfaces on the beryllium-aluminum members 15 and 20 are removed in a suitable manner, such as abrading or an acid etch. A suitable acid etch includes a mixture of hydrofluoric acid and nitric acid.

For coating the beryllium-aluminum alloy assembly 10 with an alumina-titania powder, a gun-type spray is employed, in the exemplary embodiment. The gun-type spray is of the type manufactured by Praxair Thermal Systems as the PLASMATRON SG100 gun spray with a 2086A extension. The gun-type spray has a nozzle which includes an anode, a cathode, and a power injection port. The gun-type spray includes a powder feeder with argon gas as the carrier. The powder feeder is regulated for 50±5 pounds per square inch and a flow of 20±5 cubic feet per hour.

The beryllium-aluminum alloy assembly 10 is cooled with forced air at ambient temperature. In the preferred embodiment, the temperature of the beryllium-aluminum alloy assembly 10 is not to exceed 400° Fahrenheit. after the coating of alumina-titania powder is applied thereto. After the beryllium-aluminum alloy assembly 10 has cooled to a temperature below 250° Fahrenheit., it is removed from the fixture and allowed to cool at room temperature.

Illustrated in FIG. 2 is a Table 1 showing the sheer strength of joined beryllium-aluminum alloy members that have been brazed in accordance with the present invention. The average sheer strength of the tested beryllium-aluminum alloy members brazed in accordance with the present invention was 12,192 pounds per square inch. Five samples of the joined beryllium-aluminum alloy members were used for the tests. In conducting the tests, an Instron Universal Tensile Tester was employed. The samples were advanced at a rate of 0.05 inches per minute during the test. The test was performed as per the American Welding Society recommended procedures, Section C3.2-82.

Illustrated in FIG. 3 is a Table II showing the insulation in megohms of the alumina-titania coating formed in accordance with the present invention on beryllium-aluminum alloy members brazed in accordance with the present invention. The average electrical resistance of the alumina-titania coat was 51 megohms. Five samples were employed of the beryllium-aluminum alloy members coated respectively with alumina-titania in accordance with the present invention. In conducting the tests, a General Radio Model 1863 Megohm Tester was employed.

What is claimed is:

1. A method for brazing beryllium-aluminum alloy members to form a beryllium-aluminum alloy assembly wherein the beryllium of at least one of said beryllium-aluminum alloy members being at least 45% by volume, said method comprising the steps of:
   (A) placing said beryllium-aluminum alloy members to form said beryllium-aluminum alloy assembly;
   (B) disposing a braze alloy at a location to form a braze joint between said beryllium-aluminum alloy members;
   (C) applying a brazing flux to said braze alloy at said location to form said braze joint, said brazing flux comprising:
      (a) aluminum fluoride, and
      (b) lithium fluoride; and
   (D) heating said beryllium-aluminum alloy members and said braze alloy to form said beryllium-aluminum alloy assembly.

2. A method for brazing beryllium-aluminum alloy members to form a beryllium-aluminum alloy assembly as claimed in claim 1 wherein, said aluminum fluoride is in the range of 2% and 54% by weight and said lithuium fluoride is in the range of 2% and 69% by weight.

3. A method of brazing beryllium-aluminum alloy members to form a beryllium-aluminum alloy assembly as claimed in claim 2 wherein said braze alloy is an aluminum-silicon based braze alloy.

4. A method for brazing beryllium-aluminum alloy members to form a beryllium-aluminum alloy assembly as claimed in claim 2 wherein said braze alloy is an aluminum-silicon based braze alloy, said aluminum-silicon based braze alloy forming a fillet and filling a gap at said location to form said braze joint between said beryllium-aluminum alloy members.

5. A method for brazing beryllium-aluminum alloy members to form a beryllium-aluminum alloy assembly wherein the beryllium of at least one of said beryllium-aluminum alloy members being at least 45% by volume, said method comprising the steps of:
   (a) placing said beryllium-aluminum alloy members to form said beryllium-aluminum alloy assembly;
   (b) disposing a braze alloy at a location to form a braze joint between said beryllium-aluminum alloy members;
   (c) applying a brazing flux to said braze alloy at said location to form said braze joint, said brazing flux comprising aluminum fluoride; and
   (d) heating said beryllium-aluminum alloy members and said braze alloy to form said beryllium-aluminum alloy assembly.

6. A method for brazing beryllium-aluminum alloy members to form a beryllium-aluminum alloy assembly as claimed in claim 5 wherein said braze alloy is an aluminum-silicon based braze alloy.

7. A method of brazing beryllium-aluminum alloy members to form a beryllium-aluminum alloy assembly as claimed in claim 5 wherein said braze alloy is an aluminum-silicon based braze alloy forming a fillet and filling a gap at said location to form said braze joint between said beryllium-aluminum alloy members.

8. A method for coating a beryllium-aluminum alloy member comprising the steps of:
   (a) removing oxidation from the beryllium-aluminum alloy member; and
   (b) coating said beryllium-aluminum alloy member free of oxidation with alumina-titania for providing electrical insulation.

9. A method for coating a beryllium-aluminum alloy member as claimed in claim 8 wherein said coating of alumina-titania is a powder applied by spraying.

10. A method for coating a beryllium-aluminum alloy member as claimed in claim 8 wherein said coating of alumina-titania is a powder applied by plasma deposition.

11. A method for brazing beryllium-aluminum alloy members to form a beryllium-aluminum alloy assembly and for coating said beryllium-aluminum assembly comprising the steps of:
   (a) placing said beryllium-aluminum alloy members to form said beryllium-aluminum alloy assembly;
   (b) disposing a braze alloy at a location to form a braze joint between said beryllium-aluminum alloy members;
   (c) applying a brazing flux to said braze alloy at said location to form said braze joint, said brazing flux comprising aluminum flouride;
   (d) heating said beryllium-aluminum alloy members and said braze alloy to form said beryllium-aluminum alloy assembly;
   (e) removing oxidation from said beryllium-aluminum alloy assembly; and
   (f) coating at least one said beryllium-aluminum alloy members free of oxidation with alumina-titania to provide electrical insulation.

12. A method of brazing beryllium-aluminum alloy members to form a beryllium-aluminum alloy assembly and for coating said beryllium-aluminum alloy assembly as claimed in claim 11 wherein said braze alloy is an aluminum-silicon based braze alloy.

13. A method for brazing beryllium-aluminum alloy members to form a beryllium-aluminum alloy assembly and for coating said beryllium-aluminum alloy assembly as claimed in claim 12 wherein said coating of alumina-titania is a powder applied by plasma deposition.

14. A method for brazing beryllium-aluminum alloy members to form a beryllium-aluminum alloy assembly comprising the steps of:
   (A) placing said beryllium-aluminum alloy members to form said beryllium-aluminum assembly;
   (B) disposing a braze alloy at a location to form a braze joint between said beryllium-aluminum alloy members;
   (C) applying a brazing flux to said braze alloy at said location to form said braze joint, said brazing flux comprising:
      (a) potassium chloride approximately 39.6% by weight,
      (b) aluminum fluoride approximately 5.5% by weight,
      (c) sodium chloride approximately 19.0% by weight,
      (d) sodium fluoride approximately 16.1% by weight, and
      (e) lithium fluoride approximately 19.8% by weight; and
   (D) heating said beryllium-aluminum alloy members and said braze alloy to form said beryllium-aluminum assembly.

* * * * *